United States Patent [19]

Schulze

[11] 4,352,048
[45] Sep. 28, 1982

[54] ELECTROMAGNETIC ACTUATOR APPARATUS

[75] Inventor: Dieter M. O. T. Schulze, San Jose, Calif.

[73] Assignee: Ontrax Corporation, Sunnyvale, Calif.

[21] Appl. No.: 122,245

[22] Filed: Feb. 19, 1980

[51] Int. Cl.³ .............................................. G05B 11/28
[52] U.S. Cl. .................................... 318/135; 318/687; 310/14
[58] Field of Search ........................ 318/135, 38, 687; 335/268, 259; 310/14

[56] References Cited

U.S. PATENT DOCUMENTS

| | | | |
|---|---|---|---|
| 3,162,796 | 12/1964 | Schreiber et al. | 318/687 X |
| 3,219,854 | 11/1965 | McLaughlin | 318/687 X |
| 3,275,964 | 11/1965 | Kumm | 335/259 |
| 3,430,120 | 2/1969 | Kotaka et al. | 318/687 X |
| 3,491,319 | 1/1970 | Cox et al. | 335/268 X |
| 3,870,931 | 3/1975 | Myers | 335/268 X |

Primary Examiner—B. Dobeck

[57] ABSTRACT

An improved electromagnetic actuator apparatus comprising a plurality of circular concentric tubes of varying length arranged in length order nested about one another from shortest to longest. Solenoid coil assemblies are attached to each tube so that magnetic circuits are formed between adjacent solenoid coil assemblies attached to adjacent tubes. Stops are attached to each tube at the end opposite from the solenoid coil assemblies. One of the shortest tubes is connected to a frame by a positive motion stop in one direction. A return spring connects to a frame on one end and to a carriage attachment member which slides about the shortest concentric tube on the other end. Selective electric excitation of individual solenoid coil assemblies causes translation of said carriage attachment member. The return spring carries the means for carriage attachment back to a rest position when electrical excitation is removed.

27 Claims, 8 Drawing Figures

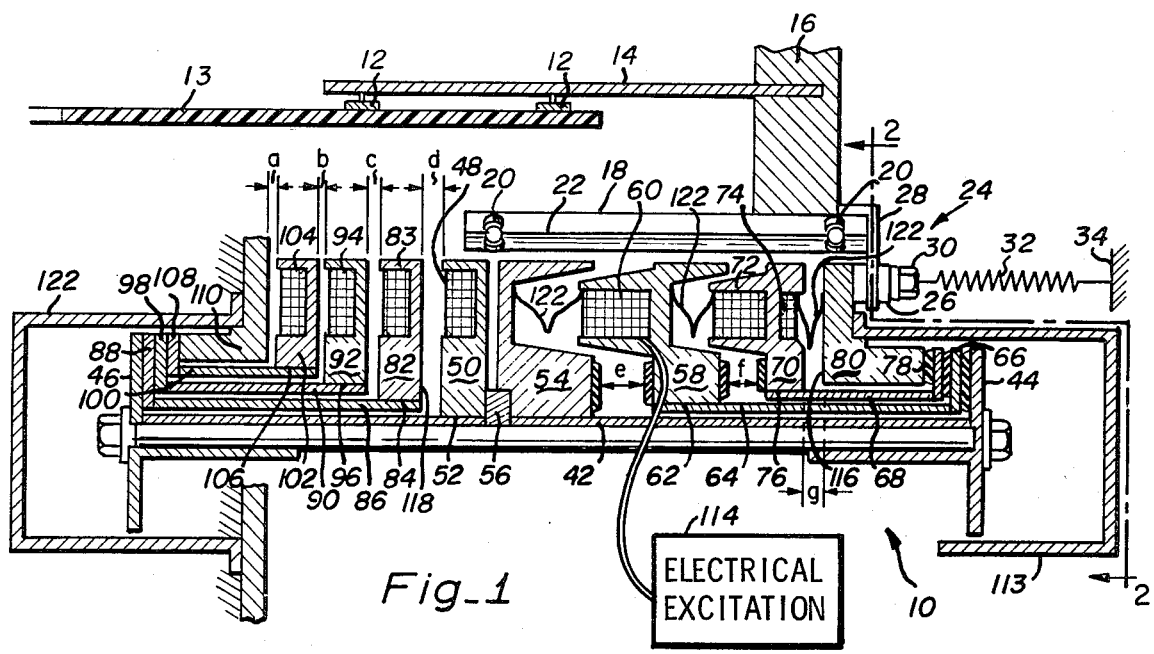
Fig_1
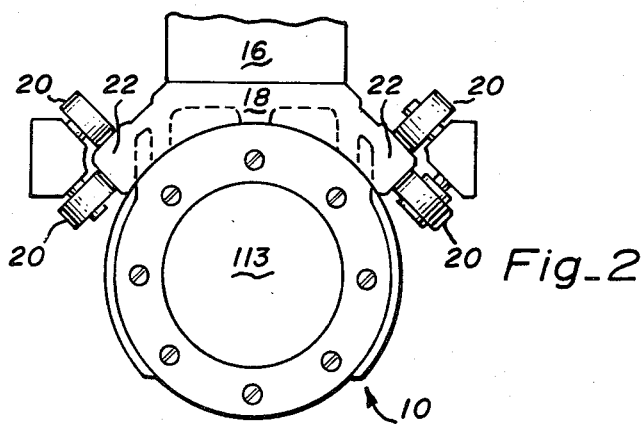
Fig_2
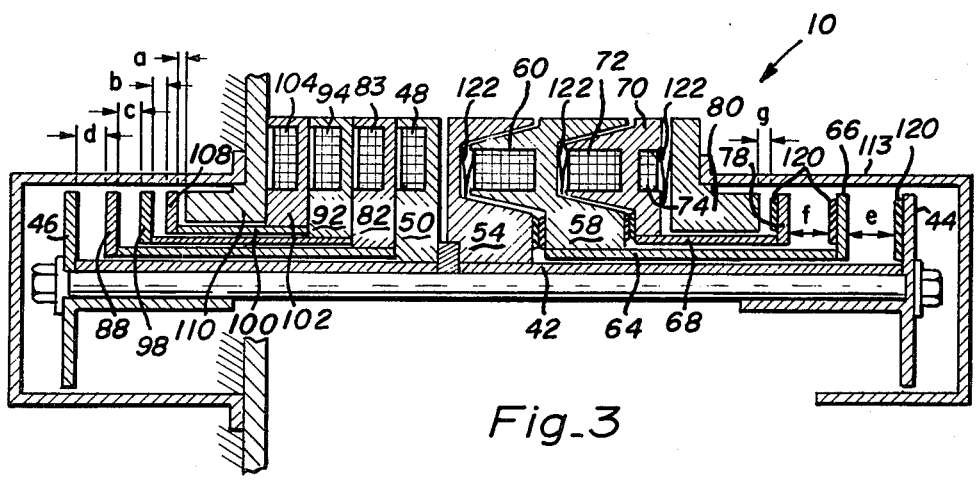
Fig_3

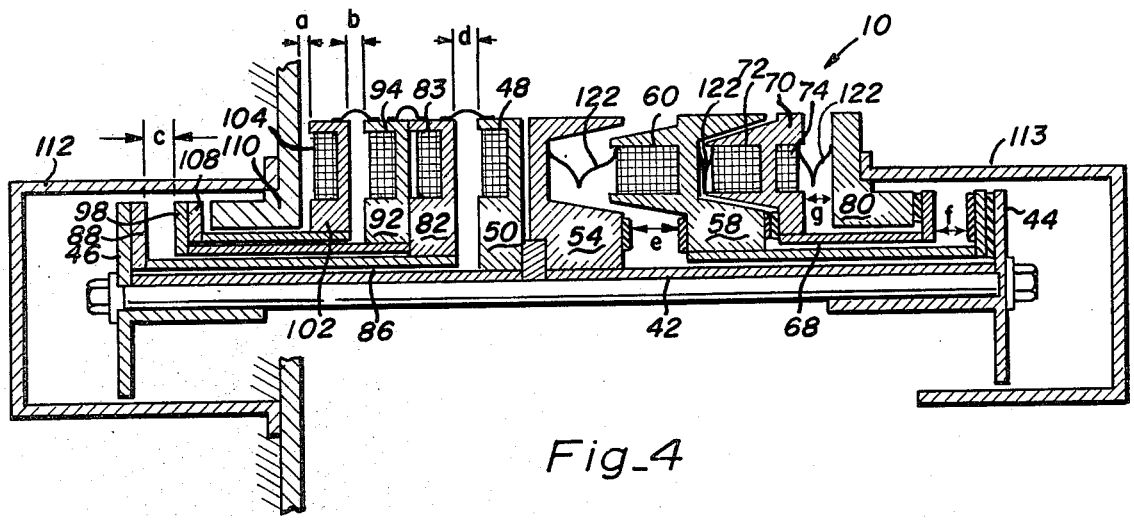
Fig_4
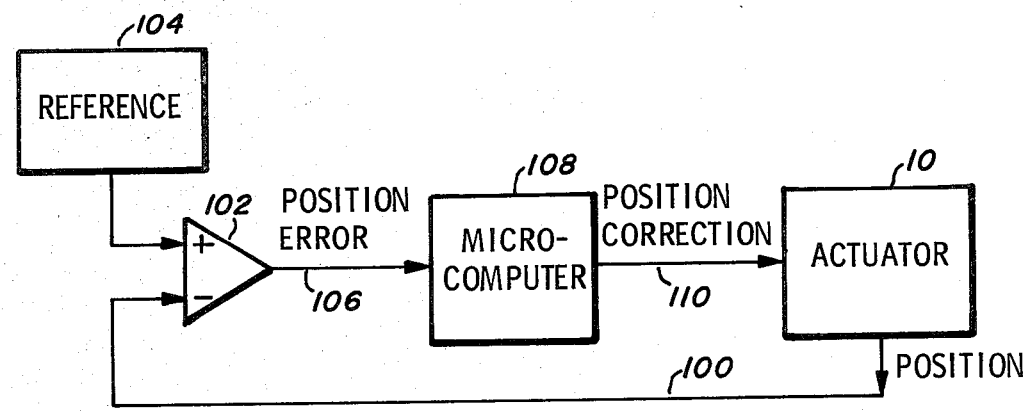
Fig_5
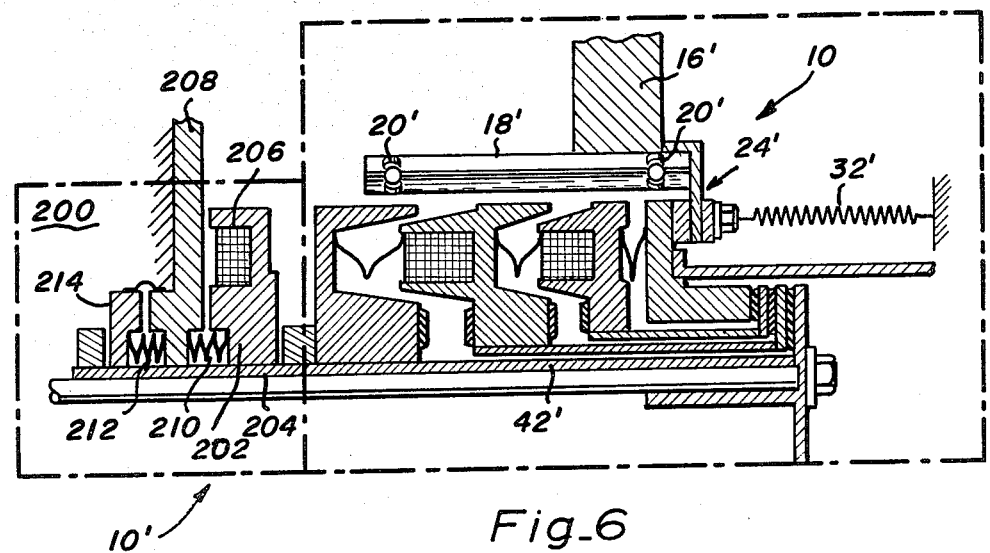
Fig_6

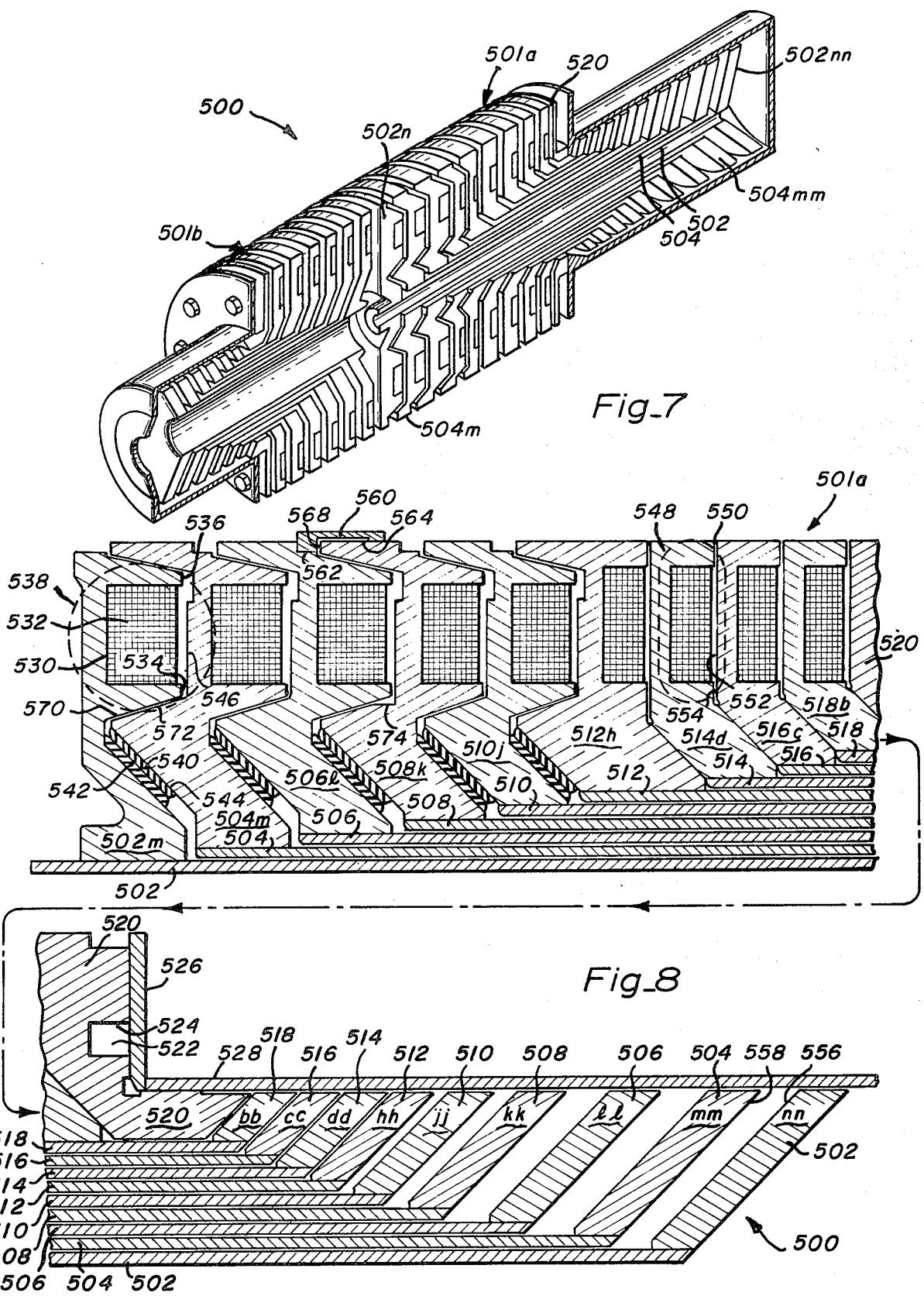

ELECTROMAGNETIC ACTUATOR APPARATUS

BACKGROUND OF THE INVENTION

1. Field of the Invention

The invention relates to an apparatus for precision positioning accomplished through sophisticated electronic control of electromagnetic actuation. The apparatus finds particular application to position read/write heads in rotating magnetic direct access storage devices.

2. Description of the Prior Art

Devices utilized for accurate and repeatable positioning are of extreme industrial importance. For example, photomasking as utilized for the manufacture of large scale integrated circuits requires the establishment of conductive and nonconductive areas on a mask with tolerances on the order of microinches. Mechanisms utilizing lead screws and voice coil motors have been used in such applications, but the hardware and/or control circuitry associated with their use is expensive and cumbersome. In another example, both analog and digital plotters that are used to create graphical representations upon a printing medium or paper with electrically varying input signals have reached a point where the mechanisms utilized for positioning the pen or print head with sufficient accuracy are expensive and cumbersome. As another common example, rotating magnetic memories utilizing magnetic disks require actuators to move read-write recording transducers or heads radially so as to permit the read-write heads to record data upon or extract data from the recording medium. The actuators for moving the recording transducers have positional accuracy requirements on the order of microinches. Such actuators must be inexpensive to manufacture, of extreme reliability, and of repeatable accuracy. Disk drive actuators of the voice coil motor type and the lead screw type are known in the art, but the objective of ever increasing precision and decreasing cost of manufacture of such disk drives would be well served by an electromagnetic actuator of extreme reliability, low cost, and simplicity of design.

One type of electromagnetic actuator which has been utilized in some precision positioning applications, including data processing applications, is a mechanism in which the primary motion-producing element is a solenoid. Solenoids of the type consisting of a cylindrically symmetrical structure in which a plunger is made to move under the urging of a magnetic field induced by a coil with suitable electrical excitation are old in the art. Simple solenoids, however, are inadequate for high-accuracy applications as special design techniques must be employed to prevent wear, nonrepeatable errors, and component failure. Moreover, a simple solenoid has merely two positions, "on" and "off", which are not suitable for multipositioning applications.

The art of solenoid positioning, however, has advanced beyond a simple "on" and "off" device. U.S. Pat. No. 3,219,854 issued to McLaughlin discloses a linear actuator constructed from a plurality of electromagnetic solenoids formed into a cylindrical stationary housing having a longitudinal bore. The bore contains a plurality of slidable plunger-core assemblies (i.e., solenoids) which are connected in series to each other and which have one end fixed to the housing and the other end attached to an output shaft. The coil of each solenoid is individually connected to a source of electrical excitation. Each solenoid operates within the longitudinal bore of the cylindrical stationary housing against its adjacent solenoid or plunger-core assembly. Moreover, the stroke of each individual solenoid is chosen to be twice the stroke of the immediately preceding solenoid. In this manner, the entire stroke of the plurality of series-connected plunger assemblies may be divided in a binary fashion so as to define discrete digital positions.

McLaughlin also teaches the use of helical coil springs between each plunger-core assembly. The helical coil springs are used to reset the plunger-core assemblies when electrical excitation is removed from a plunger-core assembly; that is, the helical coil springs are the returning force for the individual solenoids. Each helical coil spring is specified in McLaughlin as having a strength slightly less than the pulling force capable of being exerted by an energized solenoid.

U.S. Pat. No. 3,275,964 issued to Kumm discloses another electromagnetic actuator device. Kumm discloses an apparatus constructed from two solenoid sections connected and cooperating with one another along a single axis. A first section consists of a pair of solenoids operating in tandem which may be selectively energized to move an output shaft. Only upon actuation (i.e., excitation) of the first solenoid pair may the second section of solenoids be actuated. The second section of solenoids consists of three solenoids adjacent to each other and disposed about a single shaft. By appropriate excitation of the three solenoids, any of eight different positions of the output shaft may be chosen.

U.S. Pat. No. 3,430,120 issued to Kotaka et al is directed to an electromagnetic positioning mechanism. The apparatus is constructed from a plurality of plunger-type electromagnets which are arranged in side-by-side fashion so as to selectively control a plunger member which is arranged to be reciprocally moved therebetween. The Kotaka mechanism uses a multiplicity of electromagnetic actuators in serial fashion so as to choose a desired output stroke.

U.S. Pat. No. 3,491,319 issued to Cox et al discloses a digital actuator constructed from a plurality of coaxial and abutting piston adder assemblies arranged in a columnar stack. Each piston adder assembly includes a pair of coaxial cylindrical elements slidable relative to each other along their common axis. Separate spring elements are utilized to hold these individual piston adder assemblies in a normally expanded and spaced apart relationship whereby the position of an output shaft is controlled by the sum total of the linear extensions of each individual piston adder assembly. Selective contraction of designated adder assemblies can choose a variety of output shaft strokes. The structure of Cox et al bears some similarity to the structures disclosed in McLaughlin and Kumm discussed hereinabove. Cox et al again discloses the concept of a digital mechanical actuator in which the strokes of individual solenoids are chosen to be digitally related to each other. Individual spring elements are utilized to hold individual piston adder assemblies in an expanded condition.

It is thus clear that the juxtaposition of a plurality of electromagnetic plunger-core assemblies into a structure wherein the stroke of each individual plunger-core assembly is chosen to be digitally related to the other plunger-core assemblies so as to achieve a digital output is old in the art.

SUMMARY OF THE INVENTION

It is thus an object of the present invention to provide an electromagnetic digital actuator apparatus of extreme accuracy, repeatability, and reliability, which is easy to manufacture in high volume at a low manufacturing cost.

It is another object of the present invention to provide an electromagnetic actuator apparatus which is relatively insensitive to variations in duty cycle which would cause positional output errors as a function of thermal effects.

It is another object of the present invention to provide an electromagnetic actuator which does not suffer from the out of roundness effects of voice coil actuators.

It is yet another object of the present invention to provide an electromagnetic actuator apparatus in which the efficiency of individual solenoids is optimized so that minimal solenoid current is required for operation.

It is yet another object of the present invention to provide an electromagnetic actuator in which wear of load/bearing surfaces has been minimized so as to preserve the long-term accuracy and repeatability of the apparatus.

It is yet another object of the present invention to provide an electromagnetic actuator apparatus which can resolve extemely small positional differences in space.

It is another object of the present invention to provide an electromagnetic actuator apparatus which is suitable for use in a rotating magnetic direct access storage device.

It is yet another object of the present invention to provide an electromagnetic actuator apparatus with the capability for relatively high-speed motion while not excessively coupling vibrations from such motions to its base structure.

It is yet another object of the present invention to provide an electromagnetic actuator system which has the capability of positional correction in order to compensate for positional tolerance errors such as temperature, humidity, wear, etc.

It is another object of the present invention to provide an electromagnetic actuator apparatus with magnetic circuit elements of high efficiency so that the electrical excitation required for closure of the magnetic circuit is low.

It is yet another object of the present invention to provide an electromagnetic actuator apparatus with magnetic circuit elements of high efficiency so that the holding current required to reliably retain a magnetic circuit element closed is low.

In a preferred embodiment according to the present invention, a plurality of rigid circular cylinders with solenoid coil structures individually attached thereto are concentrically nested about each other. To each nested cylindrical tube is attached at one end a stop with an associated wear pad and to the other end a coil structure in a circularly symmetrical shape. Each coil structure attached rigidly to each guide cylinder is adapted in a mating relationship with its adjacent coil structure. A magnetic circuit is created between the coil structure affixed to one guide cylinder and the rear portion of the adjacent coil structure attached to the next in turn guide cylinder. The length of each cylindrical guide tube is dimensioned so that the stroke of each solenoid is approximately related in a "digital" manner to all other solenoids.

The apparatus consisting of a plurality of cylindrical guide tubes mounted about the tie rod is divided in a preferred embodiment into two sections. The first section of solenoids is utilized for relatively large stroke motions of the actuator apparatus. The second section of solenoid coils attached to cylindrical guide tubes are adapted for extremely fine actuator motions. The motions of all solenoids are adapted, if required, to operate upon a contained rubber damper coupling which attaches to a carriage and a return spring. The force of the return spring is chosen to be approximately one-half of the force attracting one solenoid to another. In this manner, the rate of stroke of the electromagnetic actuator of the present invention is approximately equal when being electrically actuated in one direction or being returned to a de-energized position in the other opposite direction. The carriage to which the electromagnetic actuator of the present invention is attached is adapted to carry a plurality of magnetic recording heads which can access information stored upon a magnetic recording disk.

The electromagnetic actuator of the present invention includes provision for intelligent control of the actuator position through a means for computation so as to dynamically adjust the position of the actuator within the limits of its finest increments. In addition, each solenoid which comprises the electromagnetic actuator of the present invention includes a seal between individual solenoid strokes so as to prevent dirt and particulate contamination from entering the structure. Moreover, a provision for damping between solenoids which operate over a relatively large stroke is included so that solenoids will not impart excessive accelerations to the structure when they close at high speeds. Further, the geometry of the individual solenoid coil structures has been optimized so that only wear-in due to repeated closure of solenoids has been minimized and solenoids seat in an extremely repeatable fashion. Further, simple electronic control of applied energy will optimize the velocity profile.

It is thus an advantage of the present invention to provide an electromagnetic actuator apparatus which is extremely compact in geometry.

It is another advantage of the present invention to provide an electromagnetic actuator apparatus which requires relatively low excitation for individual solenoid coils in order to achieve acceptable operation.

It is another advantage of the present invention that wear is minimized due to the maximization of load/-bearing surfaces.

It is yet another advantage of the present invention that relatively high rates of actuator motion may be achieved.

It is yet another advantage of the present invention that the electromagnetic actuator apparatus may be constructed in high volume at relatively low cost.

It is yet another advantage of the present invention that the electromagnetic actuator apparatus may be utilized in many demanding positioning applications including rotating magnetic direct access storage devices, precision plotters, photomasking alignment machines, laser storage systems, etc.

It is yet another advantage of the electromagnetic actuator apparatus of the present invention that real time, automatic, compensation of accuracy affecting variables may be compensated for such as temperature, wear, etc.

It is yet another advantage of the electromagnetic actuator of the present invention that "crash stops" as typically employed in voice coil motor-type actuators are not required.

These and other objects and advantages of the present invention will become apparent to those skilled in the art by referring to the following description of the preferred embodiment and by reference to the several drawing figures.

IN THE DRAWINGS

FIG. 1 is a side cut-away view of the electromagnetic actuator apparatus of the present invention with all solenoid coil assemblies de-energized and illustrated as applied to a rotary magnetic direct access storage device;

FIG. 2 is an end view of the electromagnetic actuator apparatus of the embodiment of FIG. 1 and taken along the line 2—2;

FIG. 3 is a side cut-away view of the electromagnetic actuator apparatus of FIG. 1 with all solenoid coil assemblies energized;

FIG. 4 is a side cut-away view of the electromagnetic actuator apparatus of FIG. 1 with selective solenoid coil assembly energized;

FIG. 5 is a schematic illustrating a positional feedback correction system for use with the electromagnetic actuator apparatus of the present invention;

FIG. 6 is a side cut-away view illustrating a squeeze coil embodiment as applied to the electromagnetic actuator apparatus of the present invention;

FIG. 7 is an isometric cut-away view of an alternative embodiment of the electromagnetic actuator apparatus of the present invention; and FIG. 8 is a partial cut-away side view of an alternative embodiment of the electromagnetic actuator apparatus of the present invention.

DESCRIPTION OF THE PREFERRED EMBODIMENT

Referring to FIGS. 1 and 2, a preferred embodiment of an actuator according to the present invention is shown and referred to by the general reference character 10, as incorporated in a magnetic disk drive system. FIG. 1 is a partial cut-away view taken along the longitudinal axis of motion of the electromagnetic actuator 10. FIG. 2 is an end view taken along line 2—2 of FIG. 1 and illustrates generally the disposition of the head arm carriage with respect to the circularly shaped electromagnetic actuator 10 mounted therebelow. In FIG. 1, the cylindrically symmetrical structure is only illustrated for the upper portion of said structure, but it should be kept in mind that the bottom structure is a mirror image of the upper portion illustrated. It should also be kept in mind that FIG. 1 illustrates an application of the electromagnetic actuator 10 of the present invention as applied to a rotating magnetic direct access storage device, but it is clear that the invention is not so limited in its application.

The storage device of FIGS. 1 and 2 is illustrated as including a pair of magnetic recording heads 12 positioned in proper relationship with respect to a disk 13 and are attached by conventional means to a head arm member 14 which is rigidly anchored to a vertical member 16. The vertical member 16 is thereafter rigidly anchored to a carriage 18 which is the element to be positioned by electromagnetic actuator 10. Carriage 18 moves in a generally frictionless manner from left to right upon a bearing element assembly 20 which rolls on hardened carriage surfaces adapted for that purpose.

A coupling member 24 serves as a rigid attachment between electromagnetic actuator apparatus 10, in general, and carriage 18. As illustrated in FIG. 1, coupling 24 includes a threaded fastener 26 which is disposed on one side of a carriage extension 28. An attachment member 30 threadedly engages fastener 26 through carriage extension 28. In addition, attachment member 30 functions as an anchor point for a spring 32 which functions as the main returning force element for electromagnetic actuator 10. As described in greater detail hereafter, spring 32 supplies the necessary bias upon the entire structure of electromagnetic actuator 10 so as to return the structure to a de-energized position when excitation is absent from all solenoids. Spring 32 is in principle attached as shown in FIG. 1 on the one hand to attachment point 30 and on the other hand to a non-movable structural element 34 which, in the case of a preferred embodiment is the chassis or frame of a rotating magnetic direct access storage device. The use of properly devised and placed springs facilitates operation through center of gravity.

Electromagnetic actuator apparatus 10 is formed about a cylindrical guide tube 42 which has a stop member 44 at one end and a stop member 46 on the other end. Rigidly attached to the central portion of cylindrical guide tube 42 is a solenoid coil 48 which is affixed to a magnetic coil form 50. Magnetic coil form 50 is rigidly attached at a joint 52 to cylindrical guide tube 42. Coil form 50 may be so attached to cylindrical guide tube 52 by taper swaging the cylindrical guide tube 42 to the coil form 50 or by the use of anaerobic adhesives. Both techniques have been used with success in contructing an operational model in conformance with the present invention. Adjacent and to the right of coil form 50 and rigidly affixed to cylindrical guide tube 42 is magnetic circuit element 54. In order to form a magnetic circuit suitable for operation of a solenoid, materials must be chosen with certain magnetic properties. The choice of such materials and the magnetic equations governing the performance of such mateials are well-known in the art. For example, a successful model of the present invention has been constructed with various coil forms and magnetic circuit elements utilizing soft iron, but, for example low coercivity, high permeability and porous metal powders might be utilized to optimize the present invention in certain applications.

In practice, it has been found convenient to construct cylindrical guide tube 42 from two portions which are rigidly coupled between coil form 50 and magnetic circuit element 54 by a coupling 56.

The central structure of the electromagnetic actuator 10 is divided into two portions generally about coil form 50 and magnetic circuit element 54. Solenoid elements which will be described in greater detail hereafter that are to the right of magnetic circuit element 54 are in general long-stroke solenoids which are designed to transport carriage 18 over generally long distances. On the left side of coil form 50 nested about cylindrical guide tube 42 are solenoid elements which are generally adapted for extremely fine increments of motion. As noted in FIG. 1, four solenoid elements are disposed to the left of magnetic circuit element 54 creating four different stroke lengths a, b, c, and d. To the right of magnetic circuit element 54 are disposed three solenoid elements creating strokes e, f, and g. (Note, the letters are arbitrary for illustrative purposes.)

Referring to the solenoid elements to the right of magnetic circuit element 54, directly adjacent to magnetic circuit element 54 is a coil form 58. A set of conductor coils 60 are nested within a circular cutout within coil form 58 adapted therefor. Coil form 58 is rigidly attached at a joint 62 to one end of a cylindrical guide tube 64. At the other end of cylindrical guide tube 64 is rigidly attached a stop element 66. The inside diameter of cylindrical guide tube 64 is dimensioned to slidably fit about the outside diameter of cylindrical guide tube 42. In addition, nested about cylindrical guide tube 64 is a cylindrical guide tube 68. The inside diameter of cylindrical guide tube 68 is dimensioned to permit free sliding motion upon the outside diameter of cylindrical guide tube 64. Attached to the leftmost end of cylindrical guide tube 68 is coil form 70 into which are fit coil conductors 72 on the left side and a coil conductor 74 on the right side, as shown in FIG. 1. Coil form 70 is rigidly attached to a joint 76 to cylindrical guide tube 68. At the opposite end of cylindrical guide tube 68 from coil form 70 is a stop element 78. Further, nested about cylindrical guide tube 68 is a driven member 80 which is rigidly attached to semirigid coupling 24. Driven member 80 is formed about cylindrical guide tube 68 and is dimensioned to be easily slidable thereupon.

Referring now to the solenoid element to the left of coil form 50, a coil form 82 including a plurality of coil conductors 83 is attached rigidly at a joint 84 to a cylindrical guide tube 86. The inside and outside diameters of cylindrical guide tube 86 are generally the same as cylindrical guide tube 64. At the opposite end of coil form 82 attached to cylindrical guide tube 86 is a stop element 88. Nested about cylindrical guide tube 86 is a cylindrical guide tube 90 to which is attached at one end adjacent to coil form 82 a coil form 92. Coil form 92 has a plurality of coiled conductors 94 contained within a circular slot adapted therefor, and coil form 92 is rigidly attached to cylindrical guide tube 90 at a joint 96. At the opposite end of guide tube 90 from coil form 92 is stop element 98. Similarly, nested about cylindrical guide tube 90 is a cylindrical guide tube 100 which is easily slidable over cylindrical guide tube 90. Attached to the right hand end of cylindrical guide tube 100 is a coil form 102 to which is attached conductor coils 104 disposed within a cylindrical slot in coil form 102 adapted therefore. Coil form 102 is attached to cylindrical guide tube 100 at a rigid joint 106. At the opposite end from coil form 102 on cylindrical guide tube 100 is a stop element 108. Attached thereafter and slidably formed about cylindrical guide tube 100 is a stop 110 which is rigidly affixed to an immovable reference of the device. A pair of sealed tubes 112 and 113 form a dirt and contamination shield about the electromagnetic actuator apparatus 10 and serve to support and guide motion of the stop member ends of the plurality of cylindrical guide tubes.

Operationally, all solenoids in FIG. 1 are shown deenergized. That is, strokes a, b, c, d, e, f and g are shown as open spaces awaiting appropriate excitation of the solenoids from a source of electrical excitation 114 (illustrated schematically). In this configuration, as shown in FIGS. 1 and 2, spring 32 biases carriage 18 in the extreme rightmost position and driven member 80 and stop elements 78, 66, and 44 all abut against each other. It should be noted that springs 32 are adapted in a preferred embodiment to generate a return force approximately one-half the closure force of the solenoid coil assemblies. In this manner, the electromagnetic actuator apparatus 10 tends to have equal dynamic forward and reverse performance. If coil conductor 74 is excited, a magnetic circuit is formed between coil conductor 74 through coil form 70 into the adjacent and parallel face 116 of driven member 80. This magnetic circuit will cause driven member 80 to be drawn toward coil form 70 overcoming the bias force of spring 32 and thereby translating carriage 18 to the left by a distance in an amount of stroke "g". If in addition to coil conductor 74, coil conductor 72 is also energized, then two magnetic circuits will be operative. Driven member 80 attached through semi-rigid coupling 24 to carriage 18 will be translated to the left by stroke "g", but in addition thereto, guide tube 68 will be drawn to the left by an amount of stroke "f" as coil form 70 is attracted to coil form 58. In this manner, a magnetic circuit is formed between the rear face of coil form 58 and coil form 70. Likewise, if coil conductor 60 is also energized in addition to coil conductors 72 and 74, guide tube 64 will be translated to the left by an amount of stroke "e".

With respect to the left portion or bank of solenoids, energization of coil conductor 48 causes coil form 50 rigidly attached to cylindrical guide tube 42 to be translated to the left by an amount of stroke "d" so that coil form 50 will be in abutting relationship with rear surface 118 of coil form 82. Translation of coil form 50 toward coil form 82 causes cylindrical guide tube 42 to translate to the left by an amount of stroke "d". In reaction thereto, stop member 44 on the opposite end of cylindrical guide tube 42 also translates to the left by an amount of stroke "d". Thus, the motion of solenoids constituting strokes a, b, c and d in the left most portion of the electromagnetic apparatus 10 causes the solenoid elements constituting strokes e, f and g to translate as a group to the left. Thus, it be easily seen that motions of solenoids constituting strokes a, b, c and d are in turn additively related to solenoids constituting strokes e, f and g.

The disposition of solenoids into a group located to the left of magnetic circuit element 54 and a group located to the right of magnetic circuit element 54 is a design aspect to maximize performance and efficiency of electromagnetic actuator apparatus 10. As can be seen from FIG. 1, those solenoid elements to the right of magnetic circuit element 54 have a longer stroke than those solenoid elements to the left of magnetic circuit element 54, but the mass which is required to be translated when each of the solenoids constituting strokes e, f and g are energized is less than the mass to be translated when each of the solenoid elements constituting strokes a, b, c and d are energized. This aspect of the design of electromagnetic actuator apparatus 10 tends to equalize performance between the solenoids located to the right and to the left of magnetic circuit element 54.

Referring now to FIG. 3, the electromagnetic actuator apparatus 10 of FIG. 1 is shown in a condition where all solenoid elements are energized. All stop members in FIG. 3 are spaced apart with respect to adjacent stop members by an amount equal to the stroke of the individual solenoid elements. For example, the space between stop member 66 and stop member 44 on the right most end of cylindrical guide tube 42 is equal to stroke "e". Likewise, the space between stop element 78 and stop element 66 corresponds to stroke "f" as a result of coil conductor 72 being energized and attracted thereby to surface 116. In a similar manner, solenoid elements to the left of magnetic circuit element 54 are in abutting relationship because coil conductors 104, 94, 83, and 48 are all energized. As a result of solenoid elements corresponding to strokes a, b, c and d becoming energized, stop elements 46, 88, 98, and 108 are now separated by the amount of the individual strokes of the respective solenoids. Translation of the solenoids to the left of magnetic circuit element 54 are rigidly coupled through cylindrical guide tube 42 to stop element 44, and therefore, all solenoid elements as shown in FIG. 3 are additively related to create a total stroke as displayed of a+b+c+d+e+f+g.

For the sake of illustration, FIG. 4 depicts the electromagnetic actuator apparatus 10 with solenoid elements corresponding to strokes "c" and "f" energized. That is, coil conductor 83 and coil conductor 72 are energized. This causes solenoid element 82 to be attracted to the rear face of solenoid element 92 in the case of the solenoid element corresponding to stroke "c". When solenoid element 82 is in abutting relationship with solenoid element 92, cylindrical guide tube 86 translates to the left by an amount of stroke "c" inturn and through stop element 88 causing cylindrical guide tube 42 to translate to the left by an amount of stroke "c". This translates stop element 44 to the left by an amount of stroke "c" thereby translating all solenoids to the right of magnetic circuit element 54 to the left by an amount of stroke "c". In addition, energization of coil conductor 72 causes translation of cylindrical guide tube 68 to the left by an amount of stroke "f". Therefore, due to rigid body coupling, carriage 18 will translate to the left and the total stroke as displayed in FIG. 5 will be the combined translations of solenoid strokes c+f.

There are several other aspects of the apparatus 10 that will be briefly explained. First, the apparatus 10 has been adapted to divide the total stroke of electromagnetic actuator apparatus 10 into seven discrete increments corresponding to solenoid element strokes a, b, c, d, e, f, and g. Clearly there is no necessity in any given application that the present invention be limited to a total stroke divided into seven discrete increments. Second, it is convenient to adjust the strokes of the individual solenoids so that they bear a digital relationship to one another. That is, the smallest divisible increment desired to be resolved in a practical application of the present invention would correspond to $2^1$. The next largest solenoid stroke would correspond to the number $2^2$. The nth largest solenoid would correspond to the number $2^n$. In this manner, the electromagnetic actuator apparatus 10 inherently becomes able to access any position in space from a de-energized position to a full stroke position with a resolution equal to the stroke of the smallest solenoid. Third, it is clear from the design of electromagnetic actuator apparatus 10 that a very large aspect ratio exists between the length of individual cylindrical guide tubes and the length of any given solenoid stroke. That is, the stroke of any given solenoid is but a small fraction of the cylindrical guide tube associated with the motion thereof. This design feature of the present invention tends to create a rather large load/bearing area in support of the motions of the individual solenoid elements tending to improve long term reliability and accuracy of the apparatus. A suitable material from which to construct cylindrical guide tubes is stainless steel although other materials could be employed. Fourth, it is interesting to note that the design of individual solenoid elements that comprise electromagnetic actuator apparatus 10 is not conventional. That is, conventional solenoids employ a magnetic plunger core element and a stationary coil acting upon said plunger element. Alternatively, traditional solenoids may have a moving coil and a stationary permanent magnet. In the case of electromagnetic actuator apparatus 10, individual solenoid elements form magnetic circuits as shown, for example, by the solid arrows in FIG. 1 with the rear portion of the adjacent individual solenoid element. This is extremely efficient in terms of both moving mass considerations and magnetic efficiency. Air gaps in the apparatus of the present invention have been kept to a minimum in order to enhance magnetic reluctance losses. A model constructed in accordance with the present invention has utilized soft iron for the magnetic circuit components of the individual solenoid elements, but, clearly, optimization of the permeability of such materials is within the ambit of the present invention. Fifth, while operation of solenoids in general tends to be rather "abrupt", electromagnetic actuator apparatus 10 includes means for cushioning the motions of individual solenoids so as to reduce excessive transient accelerations coupled to carriage 18. For example, rubber damper elements are included in semirigid coupling 24 in order to reduce coupled vibrations. Moreover, a series of cushioning contact pads shown in FIGS. 1, 3 and 4 are attached to the respective stop elements at the ends of the cylindrical guide tubes. For example, cylindrical guide tube 42 has attached a contact pad 120 upon stop element 44 (see FIG. 3). These contact pads tend to reduce the shock when individual solenoids are de-energized and snapped back to a "rest" position. In addition, integral seals and dampers are included so as to cushion the impact of solenoids against mating surfaces on a power or energization stroke. For example, seal and damper 122 is shown in FIGS. 1, 3 and 4. Seal and damper 122 is adapted to cushion the motions of solenoids corresponding to strokes e, f and g because those solenoids have the longest stroke and therefore the change in momentum when those solenoids strike their respective stops on a power stroke would be the greatest. Seal and damper 122 has been constructed in a successful model of the present invention in the form of a pliable ribbon bellows attached between the faces of adjacent solenoid elements. Sixth, consideration has been given in the design of electromagnetic actuator apparatus 10 to thermal stabilization in order to minimize thermally induced errors. Toward such an end it is conceivable that cylindrical guide tube elements as described hereinabove could be constructed from the material commonly known as Invar or Unispan, as examples, in order to essentially eliminate longitudinal expansion of the cylindrical guide tube elements with heating of the individual coil conductors. However, in the case of application of electromagnetic actuator apparatus 10 to a direct access storage device, it is felt that accesses to particular data tracks are most frequently of a short stroke nature than over long strokes. In fact, data is not usually accessed randomly, but particular blocks of data rather tend to be needed by the CPU more frequently than others. This phenomenon could be understood as clustering of the requirements for information, and such an observation is supported by application of high speed cache memories to direct access storage devices (see for example the Memorex 3770 and the Storage Technology 4305). With this statistical reality, short stroke solenoids will be required to be energized over time much more frequently than long stroke solenoids. Therefore, the stabilization of those solenoid elements to the left of magnetic circuit element 54 with respect to temperature will be achieved.

Application of electromagnetic actuator apparatus 10 of the present invention to high accuracy applications is most convenient in conjunction with a means for computing a position error signal and appropriately compensating the stroke of electromagnetic actuator apparatus to correspond with said position error signal. Referring to FIG. 5, a schematic representation of a system for correcting the position of electromagnetic actuator apparatus 10 depending upon positional errors from whatever sources is displayed. Electromagnetic actuator apparatus 10 always provides a position signal output 100 which is based upon the energization of individual solenoid assemblies. Said position signal 100 is compared in comparator 102 with a reference signal 104. Reference signal 104 may be generated from any of a number of different sources. For example, reference 104 may be supplied directly from servo encoded position information pre-recorded upon a magnetic recording disk in a direct access storage device, or reference signal 104 may be supplied from a moving reticle mounted upon carriage 18 adapted to supply phase encoded information relating to the position of carriage 18. In any case, position signal 100 will be compared with reference signal 104 in comparator 102 in order to generate a position error 106 which forms an input to a microcomputer 108. Microcomputer 108 can be a means for computation of tremendous capacity yielding the ability to compensate for thermal variations within electromagnetic actuator apparatus 10, duty cycle variations, nonparallelism between individual magnetic recording disks, etc. Basically, all factors can be accommodated algorithmicly within microcomputer 108. It is thus possible to generate a position correction in terms of a shift in energization of individual solenoids of electromagnetic actuator apparatus 10 in order to compensate for such conditions which normally cause position errors. Position correction signal 110 is therefore induced as a result of computation by microcomputer 108 and causes electromagnetic actuator apparatus 10 to correct for such calculated errors.

It is thus clear that electromagnetic actuator apparatus 10 can be designed to divide extremely small distances into suitable actuator strokes. It is in addition clear that a means for computing errors in position of electromagnetic actuator apparatus 10 in combination with said actuator apparatus vastly improves the versatility of the device when applied to demanding applications. In such applications requiring extreme accuracy and in those applications where a microcomputer is utilized to attain such accuracies, an additional embodiment of electromagnetic actuator apparatus 10 includes a solenoid element of adjustable stroke over a limited distance.

Referring to FIG. 6, an electromagnetic actuator apparatus 10' is displayed with structure and function similar to electromagnetic actuator apparatus 10 described above. Reference characters indicating structures with a similar function as described above are denoted by a prime designation. The alternative embodiment 10' of FIG. 6 is similar to the actuator apparatus 10 of FIG. 1 including the addition of a squeeze coil assembly 200. Squeeze coil 200 is constructed from a solenoid element 202 rigidly attached to a cylindrical guide tube 42' at a joint 204. Solenoid element 202 is adapted to receive coil conductors 206. A frame 208 forms a rigid reference surface for dimensional positioning of the electromagnetic actuator apparatus 10'. In addition, frame 208 forms an element of a magnetic circuit. If coil conductor 206 is energized, solenoid element 202 is attracted to frame 208. As a result of such electromagnetically induced attraction, any motion induced into solenoid element 202 will be transferred to cylindrical guide tube 42' and therefore shift the other solenoid elements of electromagnetic actuator apparatus 10' to the left. However, solenoid element 202 is designed not to contact frame 208 when energized, but, rather, solenoid element 202 works to compress a spring 210 and a spring 212. Spring 210 is disposed between solenoid element 202 and frame 208, and spring 212 is disposed between frame 208 and a stop element 214 rigidly affixed to cylindrical guide tube 42'. In operation, a given energization level of coil conductor 206 causes a translation to the left of solenoid element 202 to an extent exactly equalized by the compressive forces resisting such translation exerted by springs 210 and 212. By adjusting the current level within coil conductors 206, minute translational variations of solenoid element 202 and consequently cylindrical guide tube 42' may be achieved. Solenoid element 202 is thus said to "squeeze" compression springs 210 and 212 and has the character of an analog positioning device rather than the digital positioning devices of the other solenoid elements that comprise electromagnetic actuator apparatus 10'. By utilizing the squeeze coil embodiment 200 in concert with an electromagnetic actuator apparatus 10, any desired positioning accuracy may be attained giving the actuator 10' an analog positioning capacity never before employed in prior art solenoid actuators.

In order to utilize squeeze coil 200 a current or energization level for coil conductors 206 must be appropriately computed and set. The computation for the appropriate energization level for coil conductors 206 requires information as to the instantaneous positional error for electromagnetic actuator apparatus 10'. If a reference signal is available as might be applied by a closed loop or open loop servo system as is known in the prior art, then microcomputer 108 as shown in FIG. 5 can easily compute the appropriate current level for use in coil conductors 206 of squeeze coil 200. The use of a squeeze coil eliminates the need for the corrector stack and requires only one tube set resulting in a compact layout.

As described above, an electromagnetic actuator apparatus 10 has been constructed which successfully performs the objects of the present invention. However, certain other modifications to the electromagnetic actuator apparatus 10 may be employed to further improve the performance of the apparatus. Referring to FIG. 7, a perspective cutaway view of the electromagnetic actuator apparatus of the present invention employing certain alternative structures is illustrated shown by the general reference character 500. Actuator 500 is constructed in two portions connected about a center joint analogous to electromagnetic actuator apparatus 10 in FIG. 1 joined at ring 56. In FIG. 7, electromagnetic activator apparatus 500 is in two portions, an electromagnetic activator apparatus 501a and an electromagnetic activator apparatus 501b, joined about a plane shown in phantom. Consistent with electromagnetic activator 10, electromagnetic activator 500 achieves long strokes by use of solenoid elements comprising activator 501a and achieves relatively short incremental strokes by use of solenoid elements comprising activator 501*b*.

FIG. 8 is a detailed cut-away view of activator 501*a*. Activator 501*b* is not illustrated in FIG. 8 in detail as it has similar structure to the solenoid elements in activator 501*a* and merely connects to activator 501*a* by rigid attachment to a cylindrical guide tube 502. Along with cylindrical guide tube 502, a plurality of cylindrical guide tubes 504, 506, 508, 510, 512, 514, 516, and 518 are nested slidably about one another. At the leftmost end of each cylindrical guide tube is rigidly affixed a solenoid coil assembly. For example, rigidly affixed to cylindrical guide tube 502 is solenoid coil assembly 502(*n*). Attached to the other end of cylindrical guide tube 502 is a stop member 502(*nn*). Similarly, solenoid coil assembly 504(*m*) is attached rigidly to the leftmost end of cylindrical guide tube 504 and a stop member 504(*mm*) is attached rigidly to the rightmost end of cylindrical guide tube 504. The remaining solenoid coil assemblies and stop members are attached in a similar manner and likewise consistently noted in FIG. 7.

Located about cylindrical guide tube 518 and between solenoid coil assembly 518(*b*) and stop member 518(*bb*) is a carriage attachment member 520. Carriage attachment member 520 includes an opening 522 with interior circumferential threads 524. Opening 522 in concert with threads 524 provides a means for rigidly affixing a carriage (not shown) so that electromagnetic actuator apparatus 500 may move said carriage upon excitation of certain solenoid coil assemblies as described below. Rigidly attached to carriage attachment member 520 is a flange 526 which is in turn rigidly attached to a bearing tube 528. As is described in greater detail hereafter, motion of individual solenoid coil assemblies is urged in a non-binding linear manner by bearing tube 528 which supports all stop members attached to the rightmost ends of the cylindrical guide tubes. Each solenoid coil assembly includes an opening adapted to receive a coil of wire. For example, solenoid coil assembly 502(*n*) includes an opening 530. Opening 530 is uniformly filled with a plurality of wires of coil 532. Generally, wire coils 532 do not extend beyond a surface 534 nor beyond a surface 536 so that wire coils 532 are flush with the body of solenoid coil assembly 502(*n*). The other solenoid coil assemblies are constructed in a similar manner, although the actual gauge of the wire employed and the number of turns of wire may vary, depending upon the stroke of the solenoid. Illustrated in dark dashed arrows in FIG. 8 is a magnetic reluctance path 538 generated by excitation of wire coils 532 of solenoid coil assembly 502(*n*). The flow of current within wire coils 502 induces a force which tends to draw solenoid coil element 504(*m*) to solenoid coil assembly 502(*n*). Solenoid coil assembly 504(*m*) contacts solenoid coil assembly 502(*m*) along a surface 540. Surface 540 is inclined at a 45° angle with respect to the surfaces of cylindrical guide tubes 502 and 504. In this manner, contact between adjacent solenoid coil assemblies is upon coned surfaces which tend to be self-aligning. The contact surfaces can be devised by means of flat recesses to assure three point contact for repeatability. Moreover, surface 540, which constitutes a plane of contact between solenoid coil assembly 504(*m*) and solenoid coil assembly 502(*n*), is constructed from a contact pad 542 and a contact pad 544. Contact pad 542 is rigidly affixed to solenoid coil assembly 542(*n*) and likewise contact pad 544 is rigidly affixed to solenoid assembly 504(*m*). These contact pads may be constructed, for example, from polyimide material which is very suitable for this application. As the surface 540 constitutes a contacting plane between adjacent solenoid coil assemblies 502(*n*) and 504(*m*), surfaces 536 and 534 will not contact an adjacent surface 546 of solenoid coil assembly 504. Notice that solenoid coil assemblies 502(*n*), 504(*m*), 506(*l*), 508(*k*), 510(*j*) and 512(*h*) (left sides) include the use of contact pads in a manner similar to pads 542 and 544 described above. Solenoid coil assemblies 512(*h*) (right sides), 514(*d*), 516(*c*) and 518(*b*) do not include the use of such pad elements as the strokes are considerably shorter and the cushioning required therefore is much less upon impacting contact of the solenoid elements. Notice also that the magnetic reluctance path is a different geometry for solenoid coil assemblies 502(*n*), 504(*m*), 506(*l*), 508(*k*) and 510(*j*) as opposed to solenoid coil assemblies 512(*h*), 514(*d*), 516(*c*) and 518(*b*). That is, short stroke solenoids (b), (c), (d) and (h) have a magnetic reluctance path shown by the reference character 548 for solenoid coil assembly 514(*d*). In this manner, an air gap exists when the solenoid is energized between surface 550 of solenoid coil assembly 514(*d*) and surface 552 of solenoid coil assembly 516(*c*). Likewise, an air gap exists between surface 554 of solenoid coil assembly 514(*d*) and surface 552. As the stroke of solenoid (d) is much less than, for example, the stroke of solenoid (n), optimization of the magnetic reluctance path is less critical than the carefully controlled mating cone arrangement as depicted for the long stroke solenoids (n), (m), (l), (k), and (j).

FIG. 8 is depicted with all solenoid coil assemblies energized, and therefore, the solenoid coil assemblies at the leftmost end of each cylindrical guide tube are shown in abutting relationship. Therefore, the rightmost ends of the associated cylindrical guide tubes which are the stop members are shown in spaced-apart relationship. As was the case for electromagnetic actuator apparatus 10, spring return means are utilized to return electromagnetic actuator apparatus 500 to a rest position where all solenoid coil assemblies would be de-energized and all stop members would be in contact with one another. As is clear from FIG. 8 stop members rigidly affixed to the rightmost ends of the cylindrical guide tubes exhibit a similar contacting geometry to the solenoid coil assemblies at the leftmost ends of the cylindrical guide tubes. For example, stop member 502(*nn*) has a coned surface 556 which is adapted to be in a mating geometric relationship with surface 558 of stop member 504(*mm*). As accuracy and repeatability of the electromagnetic actuator apparatus 500 is a design requirement, dimensional precision in both an energized and de-energized condition is important. The contact between individual stop members is thus important for the de-energized positional accuracy of the apparatus, and the contact between solenoid coil assemblies as shown by way of example at surface 540 is likewise a requirement for the dimensional precision and repeatability of the apparatus in an energized condition.

Operationally, electromagnetic actuator apparatus 500 functions in a manner very similar to electromagnetic actuator apparatus 10. Individual solenoid coil assemblies are energized and through mechanical connection by cylindrical guide tubes and stop members, cause carriage attachment member 520 to move a specified amount. The strokes of the solenoid coil assemblies are set so that each coil assembly bears approximately a "digital" relationship to an adjacent coil assembly. In this manner, as is discussed above for electromagnetic actuator apparatus 10, any stroke necessary can be achieved with the finest division being the smallest incremental stroke of a particular solenoid coil assembly. It can be shown that individual strokes can have practical tolerances for manufacturing without jeopardizing precision.

Several other aspects, however, should be made clear by reference to electromagnetic actuator apparatus 500 in FIG. 8. First, damping means 122 as discussed with reference to FIG. 1 are not included in the electromagnetic actuator apparatus 500. In contrast with such damping bellows 122, several means may be provided within a particular application of the electromagnetic actuator apparatus 500 to provide acceptable velocity trajectory performance over a particular stroke. One way to control the velocity trajectory is to allow a microprocessor to monitor the analog profile of the current flowing within the individual solenoid coil assemblies. As is well-known in the art, a change in the current flowing in the coil can be measured as two mating and attracted surfaces approach each other. For example, as surface 546 begins to approach surfaces 534 and 536, a change in the current characteristics can be measured. This change in current profile can therefore be utilized to adjust the final seating of the mating surfaces so that contact is gentle. Alternatively, fluid compression damping can be used (except for rotating memory) as was discussed with reference to the bellows as shown by reference character 122 in FIG. 1. However, another means of employing air compression is shown in FIG. 8. A nonmetallic seal 560 is attached to solenoid coil assembly 506(l) at a surface 562. Seal 560 is in rubbing contact with surface 564 of solenoid coil assembly 508(k). As solenoid coil assembly 506(l) is energized, surface 564 of solenoid coil assembly 508(k) is drawn toward solenoid coil assembly 506(l). In the absence of a seal 560, the air caught between the opposing surfaces as they are drawn together will escape primarily about an opening 568. However, by the use of seal 560, air escape through opening 568 is prevented, and thus, the air so compressed acts as a dynamic damper preventing significant accelerations upon contact. Alternatively, it should be noted that effective damping may also be achieved within activator 500 by controlling the path of air escape through opening 568. That is, in the absence of seals 560, a torturous air path can be created by channeling the mating solenoid and stop member contacting surfaces so as to preferentially trap the compressing air, forming a dynamic damping system. In this regard, mating surface 540 between solenoid elements 502n and 504m tends to trap air therebetween upon energization of coil 530. While solenoid elements 502n and 504m only contact at surface 540, a surface 570 on solenoid element 502n and a surface 572 on solenoid element 504m come into close proximity to one another upon excitation of coil 532. Therefore, air trapped between contact pads 542 and 544 will tend to escape between surfaces 570 and 572. It is thus possible to drastically affect dynamic air damping by controlling the mating relationship of surface 570 to surface 572. Undercuts and channels impressed therein can be effectively utilized to control the air compression and such is illustrated by cutout 574 in solenoid element 508k. Clearly, damping by air compression can be applied to all solenoids and stop members although illustrated for but a pair of mating surfaces in FIG. 8. Second, the reluctance path of electromagnetic actuator apparatus 10 and 500 has been optimized so that when a particular solenoid coil assembly has been energized and closes under the urging of such electromagnetic forces, the current may be reduced once closure is achieved so as to reduce power consumption and thermal effects in the static condition.

It is clear from the above description of two embodiments of the electromagnetic actuator apparatus of the present invention that said apparatus solves many of the problems inherent in solenoid actuators of the prior art. It should be noted that absolutely no magnetic isolation is necessary in the electromagnetic actuator apparatus 10 or 500. Air gaps have been held to a minimum so as to increase the efficiency of the magnetic circuits of the provided (i.e., the cylindrical guide tubes) so that wear problems and accuracy over many millions of actuations is assured. With respect to electromagnetic actuator apparatus 500, the use of mating cones tends to assure extremely reliable and repeatable precision along with efficient and reliable damping. That is, the solenoid coil assemblies in an energized or de-energized state always translate the carriage element to the same spatial position or increment. Moreover, due to the efficiency of the magnetic circuits of the present invention, the current requirement of the coils are rather low, and, still, the time to actuate a given coil assembly is extremely low. In a model constructed in accordance with the present invention and utilized in conjunction with a rotating magnetic direct access storage device, it was found that average access times in the range of less than 20 milliseconds for a stroke of approximately 0.5 inches were achieved without the use of exotic high-permeability materials for the individual solenoid coil assemblies. Further, the use of either an open loop or a closed loop servo in conjunction with a microcomputer 108 as illustrated in FIG. 5 provides a means to self-correcting the position in space of the desired element (be it a magnetic recording head or a plotter pen, for example) with selfcorrecting precision. Further, the use of a structure similar to squeeze coil 200 as illustrated in FIG. 6 in conjunction with either electromagnetic actuator apparatus 10 or electromagnetic apparatus 500 provides extremely fine analog positioning capability with high stiffness and self-calibration advantages, making the present invention suitable for many high precision demanding applications.

While for the sake of clarity, and in order to disclose the invention so that the same can be readily understood, a specific embodiment has been described and illustrated, it is to be understood that the present invention is not limited to the specific means disclosed. It may be embodied in other ways that will suggest themselves to persons skilled in the art. It is believed that this invention is new and that all such changes that come within the scope of the following claims are to be considered as part of this invention.

What is claimed is:

1. An improved electromagnetic actuator apparatus, comprising:

a plurality of connecting members each of different length arranged in an assembly by order of length from the shortest connecting member to the longest connecting member;

means for providing parallel lengthwise motion of each of said connecting members within the assembly of said connecting members;

a plurality of solenoid coil assemblies one each rigidly attached to one end of each connecting member with each solenoid coil assembly forming a magnetic circuit with the adjacent solenoid coil assembly attached to the adjacent connecting member;

a plurality of stop members with one each attached to each connecting member at the opposite end from the solenoid coil assembly attached to each of said connecting members;

means for anchoring one end of one of the shortest connecting member, said means for anchoring connected to a frame and providing a positive motion stop of said longest connecting member in a first direction parallel to the lengthwise dimension of said connecting members;

means for carriage attachment adapted to move adjacent and parallel to the lengthwise dimension of said shortest connecting member between said shortest connecting member solenoid coil assembly and said stop member;

means for bias return of said means for carriage attachment urging motion of said means for carriage attachment opposite and away from said means for anchoring one end of the longest connecting member with one end of said means for spring return connected to said means for carriage attachment and the other end of said means for spring return connected to said frame;

means for selective excitation of individual solenoid coil assemblies, wherein said means for bias return tends to urge all of said stop members into abutting relationship and the excitation stroke of each solenoid coil assembly is in a substantially digital relationship with respect to the stroke of the other solenoid coil assemblies so that said means for carriage attachment may be translated to any position corresponding to any combination of the excitation strokes of the individual solenoid coil assemblies.

2. The improved electromagnetic actuator apparatus of claim 1, wherein said connecting members are concentric tubes movable with respect to one another and arranged with said longest tube having the smallest diameter and said shortest tube having the largest diameter.

3. The improved electromagnetic actuator apparatus of claim 2, wherein said concentric tubes are of circular cross-section.

4. The improved electromagnetic actuator apparatus of claim 2, wherein said means for bias return exerts a return force upon said means for carriage attachment equal to approximately one-half the closure force of said solenoid coil assemblies upon excitation.

5. The improved electromagnetic actuator apparatus of claim 2, wherein each of said solenoid coil assemblies is adapted to contact an adjacent solenoid coil assembly upon a mating surface in the general shape of a cone, flat or sphere.

6. The improved electromagnetic actuator apparatus of claim 5, wherein each of said stop members contacts an adjacent stop member under urging of said means for spring return upon a mating surface in the general shape of a cone, flat or sphere making full circumferential or 3 point contact.

7. The improved electromagnetic actuator apparatus of claim 2, further comprising;

means for detecting the position in space of a carriage attached to said means for carriage attachment, means for comparing an actual measured position of said carriage with an intended position of said carriage, means for computing a change in the position of said carriage so as to move said carriage position toward said actual intended carriage position.

8. The improved electromagnetic actuator apparatus of claims 2 or 7, further comprising;

a squeeze coil located mechanically in series with said means for carriage attachment with said squeeze coil comprising a solenoid coil element, a magnetic circuit element forming a magnetic reluctance path with said solenoid coil element, a compression spring connected on the one hand to said solenoid coil element and on the other hand to said magnetic circuit element, and means for electrical excitation control of current flow within said solenoid coil element, wherein, incremental variations in electrical excitation of said solenoid coil element cause proportional incremental variations in compression of said compression spring.

9. The improved electromagnetic actuator apparatus of claim 8, wherein said means for carriage attachment is rigidly connected to a pluralty of magnetic read/write transducers in a rotating magnetic direct access storage drive.

10. The improved electromagnetic actuator apparatus of claim 8, further comprising:

means for sealing the stroke between said individual solenoid coil assemblies with said means for sealing constructed from a pliable bellows concentric with said concentric tubes generally contacting the periphery of adjacent solenoid coil assemblies and forming an air-tight seal therebetween.

11. The improved electromagnetic actuator apparatus of claim 8, further comprising:

means for sealing the stroke between said individual solenoid coil assemblies with said means for sealing constructed from a circumferential ring of resilient material rigidly attached to one peripheral edge of a solenoid coil assembly and slidably in contact with the peripheral edge of an adjacent solenoid coil assembly.

12. The electromagnetic actuator apparatus of claim 8, further comprising;

means for sensing the temperatures of said improved electromagnetic actuator assembly, and means for computing a positioned correction to the actual position of said means for carriage attachment as a result of thermal expansion or contraction of said improved electromagnetic actuator apparatus.

13. The improved electromagnetic actuator apparatus of claim 5, further comprising:

dynamic air compression claiming means formed from compression of air at said conical mating surfaces and including at least one air escape path formed between adjacent and generally parallel faces of said mating solenoid coil assemblies with said air escape path regulating the release of compressed air upon closure of said mating solenoid coil assemblies.

14. The improved electromagnetic actuator apparatus of claim 13, wherein said air escape path includes at least one undercut in said adjacent and generally parallel mating solenoid coil assemblies.

15. An improved electromagnetic actuator apparatus for moving a mass, comprising:

a plurality of connecting members arranged in an assembly;

means supporting said connecting members in a predetermined spaced relationship and to allow lengthwise movement of each connecting member independent of the other connecting members;

a plurality of solenoid coil assemblies one attached to each connecting member with said coil assemblies arranged in one or more groups such that each solenoid coil assembly of a group includes a mating surface spaced from and forming a magnetic circuit with the next adjacent coil assembly of the group and energization and deenergization of a coil assembly will cause movement of that coil assembly towards said adjacent coil assembly and a corresponding movement of the attached connecting member;

means to maintain each connecting member and coil assembly in the predetermined spaced position relative to the adjacent coil assemblies until such coil assembly or an adjacent coil assembly is energized;

anchor means for anchoring at least one connecting member such that energization and deenergization of selected coil assemblies will move said coil assembly and connecting member relative to said anchor means; and means for attaching said connecting members to the mass for movement of the mass from an original position relative to said anchor means as any connecting member is moved.

16. An electromagnetic actuator as defined in claim 15 wherein said portion of said coil assembly comprises a core portion around which is wrapped an energizing coil.

17. An electromagnetic actuator as defined in claim 15 including a spring fixed to said mass for returning said mass toward said original position as selected coil assemblies are deenergized.

18. An electromagnetic actuator as defined in claim 17 wherein said means to maintain all other coil assemblies in their predetermined position relative to each other comprise upstanding stops fixed to said connecting members.

19. An electromagnetic actuator as defined in claim 18 wherein said stops are arranged in consecutive order with the one fixed to the connecting member attached to said coil assembly furthest away from said stops being positioned furthest from said coil assemblies and the remaining stops being positioned in consecutive order closer to said coil assemblies.

20. An electromagnetic actuator as defined in claim 15 wherein said connecting members are concentrically positioned cylinders.

21. An electromagnetic actuator as defined in claim 15 including a squeeze coil connected between one connecting member and said mass and operable to move said mass relative to said connecting member a distance porportional to the degree of energization of said squeeze coil; and means to selectively energize said squeeze coil to move said mass relative to said connecting member.

22. An electromagnetic actuator as defined in claim 15 wherein some of said coil assemblies form an air pocket with the corresponding adjacent coil assemblies thereby to trap the air and slow the movement of the coil assembly.

23. An electromagnetic actuator as defined in claim 15 wherein said mating surfaces are of a complementary conical configuration.

24. An electromagnetic actuator as defined in claim 15 including sealing means extending around each mating surface to prevent contamination from said mating surface.

25. An improved electromagnetic actuator for moving a mass comprising:

a plurality of tubular connecting members nested concentrically in an assembly;

means supporting said connecting members to allow lengthwise movement of each connecting member independent of the other connecting members;

a plurality of solenoid coil assemblies one attached to each connecting member and including a magnetic core and coil assembly extending concentrically about said nested connecting members, said solenoid coil assemblies being arranged in one or more groups with each coil assembly being spaced a predetermined distance from the next adjacent coil assembly and forming therewith mated surfaces which with energization of said coil the energized coil assembly is moved towards the adjacent coil assembly to bring the respective mated surfaces together to shift the attached connecting member the distance the mated surfaces are moved relative to each other.

26. An improved electromagnetic actuator as defined in claim 25 including spring means exerting a force for maintaining said coil assemblies in spaced relationship until energization of the coil moves said mated surfaces together by overcoming the force of said spring means.

27. An improved electromagnetic actuator for moving a mass comprising:

a plurality of connecting members arranged for movement in an assembly;

a plurality of solenoid coil assemblies one attached to each connecting member with said coil assemblies being in a predetermined spaced relationship such that energization of said coil assembly will move it and the attached connecting member a predetermined distance;

a squeeze coil operable to move a portion thereof a distance porportional to the energization of said coil;

means connecting said connecting members to said mass such that the movement of any connecting coil moves said mass;

means connecting said squeeze coil to said mass such that movement of said portion thereof moves said mass a proportional distance; and means to selectively energize said solenoid coil assemblies and said squeeze coil to move said mass a desired distance.

* * * * *